United States Patent [19]

Nagumo et al.

[11] Patent Number: 5,721,946
[45] Date of Patent: Feb. 24, 1998

[54] SIGNAL TRANSFER METHOD HAVING UNIQUE WORD ASSIGNED TO TERMINAL STATIONS APPENDED BEFORE CONTROL FRAMES ORIGINATED FROM CONTROL STATION AND TERMINAL STATIONS

[75] Inventors: Mikio Nagumo; Hiroshi Iwasa; Keiji Okamoto, all of Hyogo, Japan

[73] Assignee: Mitsubishi Denki Kabushiki Kaisha, Tokyo, Japan

[21] Appl. No.: 56,788

[22] Filed: May 4, 1993

[30] Foreign Application Priority Data

May 13, 1992 [JP] Japan .................... 4-146920

[51] Int. Cl.$^6$ .................. G06F 13/42; G06F 15/16
[52] U.S. Cl. .............. 395/824; 395/850; 395/200.66; 395/200.38; 395/290; 364/132
[58] Field of Search ............... 395/850, 853, 395/856, 823, 824, 825, 200.38, 200.39, 200.4, 290, 200.75, 200.66; 364/138, 132

[56] References Cited

U.S. PATENT DOCUMENTS

| | | | |
|---|---|---|---|
| 3,623,013 | 11/1971 | Perskins | 395/829 |
| 3,851,104 | 11/1974 | Willard et al. | 364/200 |
| 4,125,874 | 11/1978 | Higashide et al. | 395/824 |
| 4,168,469 | 9/1979 | Parikh et al. | 395/200.17 |
| 4,264,954 | 4/1981 | Briggs et al. | 364/200 |
| 4,357,658 | 11/1982 | van der Ouderaa | 364/200 |
| 4,402,067 | 8/1983 | Moss et al. | 365/219 |
| 4,403,288 | 9/1983 | Christian et al. | 395/275 |
| 4,463,421 | 7/1984 | Laws | 364/200 |
| 4,652,933 | 3/1987 | Koshiishi | 358/256 |
| 4,667,193 | 5/1987 | Cotie et al. | 364/200 |
| 4,683,530 | 7/1987 | Quatse | 364/200 |
| 4,725,836 | 2/1988 | Guidos | 364/200 |
| 4,780,815 | 10/1988 | Shiota | 364/200 |
| 4,823,347 | 4/1989 | Chin et al. | 371/49 |
| 4,872,003 | 10/1989 | Yoshida | 340/825.08 |
| 5,163,137 | 11/1992 | Yamamoto et al. | 395/286 |
| 5,247,657 | 9/1993 | Myers | 395/550 |
| 5,317,693 | 5/1994 | Cuenod et al. | 395/275 |
| 5,347,523 | 9/1994 | Khatri et al. | 371/22.3 |
| 5,379,395 | 1/1995 | Nakabayashi et al. | 395/425 |
| 5,410,717 | 4/1995 | Floro | 395/800 |
| 5,459,579 | 10/1995 | Hu et al. | 358/296 |

FOREIGN PATENT DOCUMENTS

| | | |
|---|---|---|
| 0255767 | 2/1988 | European Pat. Off. . |
| 0466555 | 1/1992 | European Pat. Off. . |
| 63-39231 | 2/1988 | Japan . |
| 63-177246 | 7/1988 | Japan . |
| 3232040 | 10/1991 | Japan . |
| 2228603 | 8/1990 | United Kingdom . |

*Primary Examiner*—Dinh C. Dung
*Attorney, Agent, or Firm*—Rothwell, Figg, Ernst & Kurz

[57] ABSTRACT

A signal transfer method for transmitting and receiving signals between a control apparatus and a plurality of controlled apparatuses. In order to achieve the signal transfer method which can remarkably reduce the number of signal lines of a bus cable, individually reset the controlled apparatuses in the same structure from the control apparatus and utilizes the control frame in the maximum for the control signal itself, a control address and a transmission line address are serialized and are transmitted with a common serial address line, a transmission control signal line is used in common with a control response and a transmission control signal sent from the peripheral units while a reception control signal line with a control command and a reception control signal sent from the common controller, a controlled apparatus executes the control for resetting thereof by detecting a reset character individually assigned thereto, and a terminal station or a terminal station group can be discriminated by adding a unique word to the region immediately before the control frame.

3 Claims, 11 Drawing Sheets

SIGNAL TRANSFER METHOD HAVING UNIQUE WORD ASSIGNED TO TERMINAL STATIONS APPENDED BEFORE CONTROL FRAMES ORIGINATED FROM CONTROL STATION AND TERMINAL STATIONS

BACKGROUND OF THE INVENTION

1. Field of the Invention

The present invention relates to a signal transfer method for enabling transmission and reception of signals between a host (control) apparatus and a plurality of controlled apparatus and more specifically to simplification of bus structure, reset and control of controlled apparatus.

2. Description of the Prior Art

FIG. 1 is a block diagram indicating a conventional signal transfer method. In this figure, the reference numeral 101 designates a common controller, while 102, 103, channels as the peripheral apparatus. 104, a CPU bus comprising a CPU address bus 110 consisting of X signal lines, a CPU control bus 111 consisting of Y signal lines and a CPU data bus 112 consisting of Z signal lines for connecting the common controller 101 and channels 102, 103, 105, a transmission line bus comprising a transmission line address bus 113 consisting of W signal lines, a transmitting data line 114, a receiving data line 115, a transmitting control signal line 115 and a receiving control signal line 117 for connecting the common controller 101 and channels 102, 103.

Operations of the conventional signal transfer method will be explained hereunder. Here, FIG. 2 is an explanatory diagram indicating transmission and reception timings of various data and signals which are transmitted over each bus of the CPU bus 104 and transmission line bus 105 and signal lines. In FIG. 2, the alphabet "A" defines address or data lines concerning the channel 102, while the alphabet "B", those of the channel 103. The common controller 101 sends an address for designating a channel 102 or 103 to the CPU address bus 110 or a command set or response request to the CPU control bus 111 in order to control the channel 102 or 103 and request the response. Here, in the case of controlling the channel 102 or 103, the CPU data bus 112 transmits a command, or the response at the time of requesting the response. Next, depending on the address transmitted to the transmission line address bus 113 by the common controller 101, the channel 102 or 103 transmits data to the transmitting data line 114 and transmitting control signal to the transmitting control line 116 and receives data transmitted to the receiving data line 115 and receiving control signal transmitted to the receiving control signal line 117 by the common controller 101.

Other references, for example, the Official Gazettes of the Japanese Laid-Open Patent Nos. 177246/1988 and 39231/1988 also describe the technology in relation to a conventional data transfer system of the prior art.

FIG. 3 is a block diagram indicating a conventional signal transfer method described, for example, in the Official Gazette of the Japanese Laid-Open Patent No. 238751/1991. In this figure, the reference numeral 201 designates a control apparatus, while 202, a plurality of controlled apparatus for transmission and reception of signals with this control apparatus 203, a serial control line for connecting these control apparatus 201 and the controlled apparatus 202.

In the control apparatus 201, the reference numeral 211 designates a processor for total control of the control apparatuses 201 and 212, a memory for storing programs and data to be used in the course of processing operations by the processor 211, 213, a serial communication controller for controlling transmission and reception to or from a serial control line 203 of the signal to be input and output to or from the control apparatus 201, 214, an internal bus for connecting the processor 211, memory 212 and serial communication controller 213, 215, a break generator connected to the internal bus 214 to send character for resetting each controlled apparatus 202 to the serial control line 203.

In the controlled apparatus 202, the reference numerals 221, 222, 223, 224 respectively denote a processor, a memory, a serial communication controller and an internal bus identical to 211, 212, 213 and 214, 225, a break detector for detecting a character for resetting the controlled apparatus 202 transmitted over the serial control line 203 from the break generator 215 of the control apparatus 201, 226, a reset signal line for transmitting the reset signal output from the break detector to the processor 221.

Operations will then be explained hereunder. When the control apparatus 201 requests to reset the controlled apparatus 202, the control apparatus 201 instructs transmission of a character for resetting the controlled apparatus 202 to the break generator 215 from the processor 211 thereof. Upon reception of the instruction, the break generator 215 generates and transmits the character for resetting the controlled apparatus 202 to the serial control line 203.

The character transmitted from the control apparatus 201 is transmitted to the controlled apparatus 202 through the serial control line 203 and is detected by respective break detector 225. The break detector 225 transmits, upon detection of the reset character on the serial control line 203, the reset signal to the processor 221 via the reset signal line 226. Therefore, the processors 221 in the controlled apparatus 202 are reset at a time with this reset signal.

Moreover, FIG. 4 shows a format of a control frame which is used for the signal transfer method of a conventional terminal station control system to transfer the control signal. In this figure, the reference numeral 301 designates a control frame for transmitting and receiving the control signal, 311, a frame synchronization pattern with which a terminal station explained later establishes frame synchronization by continuous reception thereof, 312, a terminal station ID region for transmitting an ID information to discriminate each terminal station, 313, a control signal region for transmitting the control signal itself of a control signal.

FIG. 5 shows a structure indicating an example of a communication system to which the signal transfer method explained above is applied. In this figure, 302a, 302b, 302c defines a plurality of terminal stations, while 303, a control station which is linked with the terminal stations 302a, 302b, 302c by a radio link to integrally control such terminal stations 302a, 302b, 302c by transmitting and receiving the control signal with a control frame 301 having the format shown in FIG. 4.

Operations in such communication system will then be explained hereunder. The control station 303 enables control for the terminal stations 302a, 302b, 302c by transmitting and receiving the control frame 301 shown in FIG. 4. For example, when the control station 303 desires to make access to the terminal station 302a, the control station 303 sends the control frame 301 to the terminal station 302a in the format shown in FIG. 4. In this case, ID information of the terminal station 302a is set in the terminal station ID region 312 of the control frame 301 before transmission thereof for discrimination from the other terminal stations 302b, 302c. Upon reception of the control frame 301, the terminal station 302a checks the terminal station ID region 312. When the terminal station 302a confirms that the control frame 301 is bound for itself, the terminal station 302a conducts necessary processing on the basis of the control signal itself of the control signal region 313. Meanwhile, the other terminal stations 302b, 302c also check in the same manner the terminal station ID region 312 of the control frame and respectively neglect this control frame by confirming that this control frame 301 is not destined thereto.

Transmission of the control frame to the control station 303 from the terminal station 302a can be conducted in the same fashion. That is, the terminal station 302a sends the control frame 301 setting the ID information thereof in the terminal station ID region 312 and the control station 303 checks such terminal station ID region 312 to discriminate the control frame 301 transmitted from the terminal stations 302a. As explained above, the control station can control individually the terminal stations 302a, 302b, 302c by transmitting the control frame 301 in which the ID information individually assigned to the terminal stations 302a, 302b, 302c is set in the terminal station ID region 312.

The technology for utilizing a unique word used in the present invention is described in the Official Gazettes Japanese Laid-Open Patent Nos. 61523/1988, 51727/1989, 77234/1989, 7631/1990 and 285822/1989.

Since a conventional signal transfer method shown in FIGS. 1 and 2 is constituted as described above, both CPU bus 104 and transmission line bus 105 are required for data transfer between the common controller 101 and peripheral units 102, 103 and moreover the CPU address bus 110, CPU control bus 111, CPU data bus 112 and transmission line address bus 113 forming above structure are constituted by a plurality of signal lines for the parallel transmission. Accordingly, a large number of signal lines are required, resulting in enlargement of the apparatus. Meanwhile, in the case of the signal transfer method shown in FIG. 3 of the prior art, detection of reset character depends on a hardware structure of the break detector 225 in the controlled apparatus 202, the controlled apparatus are reset at a time in such a system as providing a plurality of controlled apparatus 202 of the same structure and it is impossible to reset only the predetermined controlled apparatus, and therefore the hardware structure of the break detector 225 of the controlled apparatus 202 must be designed in different fashion corresponding to different reset character in order to reset only the predetermined controlled apparatus among a plurality of controlled apparatus 202. Moreover, the signal transfer method shown in FIG. 4 and FIG. 5 of the prior art has been accompanied by the problems that since the terminal stations 302a, 302b, 302c are discriminated depending on content of the terminal station ID region 312 in the control frame 301, the control signal region 313 in which the control signal itself is set must be reserved in short-length as much as the length of the terminal station ID region 312, reducing the amount of information to be transmitted. As a result, when various kinds of control signals are defined, the control frame 301 must be longer.

SUMMARY OF THE INVENTION

In view of the foregoing, it is an object of the present invention to provide a signal transfer method which enables reduction of the number of signal lines.

It is another object of the present invention to provide a signal transfer method which enables reset control for only one predetermined controlled apparatus among a plurality of controlled apparatus having the same structure.

It is further object of the present invention to provide a signal transfer method which utilizes a control frame in the maximum for a control signal itself.

According to the first aspect of the present invention, for achieving the above-mentioned objects, there is provided a signal transfer method which serializes both control address and transmission line address to send these addresses using a serial address line and uses in common the transmission control signal line with response and transmission control signal from the peripheral units and also uses in common the reception control signal line with command and reception control signal from the common controller.

According to the second aspect of the present invention, there is provided a signal transfer method which adds a sign for discriminating control signal band or data band to each address transmitted over the serial address line for further common use of the transmission control signal line and transmission data line and common use of the reception control signal line and reception data line.

According to the third aspect of the present invention, there is provided a signal transfer method which assigns characters to the controlled apparatus for individually resetting these controlled apparatus and thereby causes each controlled apparatus to execute the control for reset thereof by detecting the character assigned thereto.

According to the fourth aspect of the present invention, there is provided a control system which changes the setting of reset characters of respective controlled apparatus depending on the instructions transmitted to the controlled apparatus from the control apparatus.

According to the fifth aspect of the present invention, there is provided a signal transfer method which adds a different unique word for each terminal station immediately before the control frame to individually control each terminal station by discriminating this unique word.

According to the sixth aspect of the present invention, there is provided a signal transfer method which sets a unique word, which is added immediately before the control frame, corresponding to a group of terminal stations grouped for the predetermined purpose.

As stated above, a signal transfer method according to the first aspect of the present invention realizes the signal transfer method which uses in common a serial address line by serializing a control address and a transmission line address and also uses in common the transmission control signal line with a control response and a transmission control signal from peripheral units and also uses in common the reception control signal line with a control command and a reception control signal from the common controller, thereby remarkably reducing the number of signal lines of a bus cable.

Further, a signal transfer method according to the second aspect of the present invention realizes the signal transfer method which adds a sign for discriminating a control signal band and a data band to each address and uses in common a transmission control signal line and a transmission data line and also uses in common a reception control signal line and a reception data line, thereby further reducing the number of signal lines of a bus cable.

Further, a signal transfer method according to the third aspect of the present invention realizes the signal transfer method which can reset only the predetermined controlled apparatus among a plurality of controlled apparatus formed in the same structure by controlling the reset of a controlled apparatus itself when each controlled apparatus detects a reset character assigned on the serial control line.

Further, a signal transfer method according to the fourth aspect of the present invention realizes the signal transfer method which enables more flexible reset control by changing the setting of a reset character of each controlled apparatus with an instruction transmitted to the controlled apparatus from a control apparatus.

Further, a signal transfer method according to the fifth aspect of the present invention realizes the signal transfer method which adds a unique word immediately before the control frame and individually controls terminal stations through discrimination of a terminal station by changing this unique word for each terminal station, thereby using the control frame in the maximum for the control signal itself.

Further, a signal transfer method according to the sixth aspect of the present invention realizes the signal transfer method which enables control of terminal stations in unit of a group having the same purpose by setting a different unique word to each terminal station group.

The above and further objects and novel features of the invention will more fully appear from the following detailed description when the same is read in connection with the accompanying drawing. It is to be expressly understood, however, that the drawings are for purpose of illustration only and are not intended as a definition of the limits of the invention.

DETAILED DESCRIPTION OF THE PREFERRED EMBODIMENTS

Figure 1:
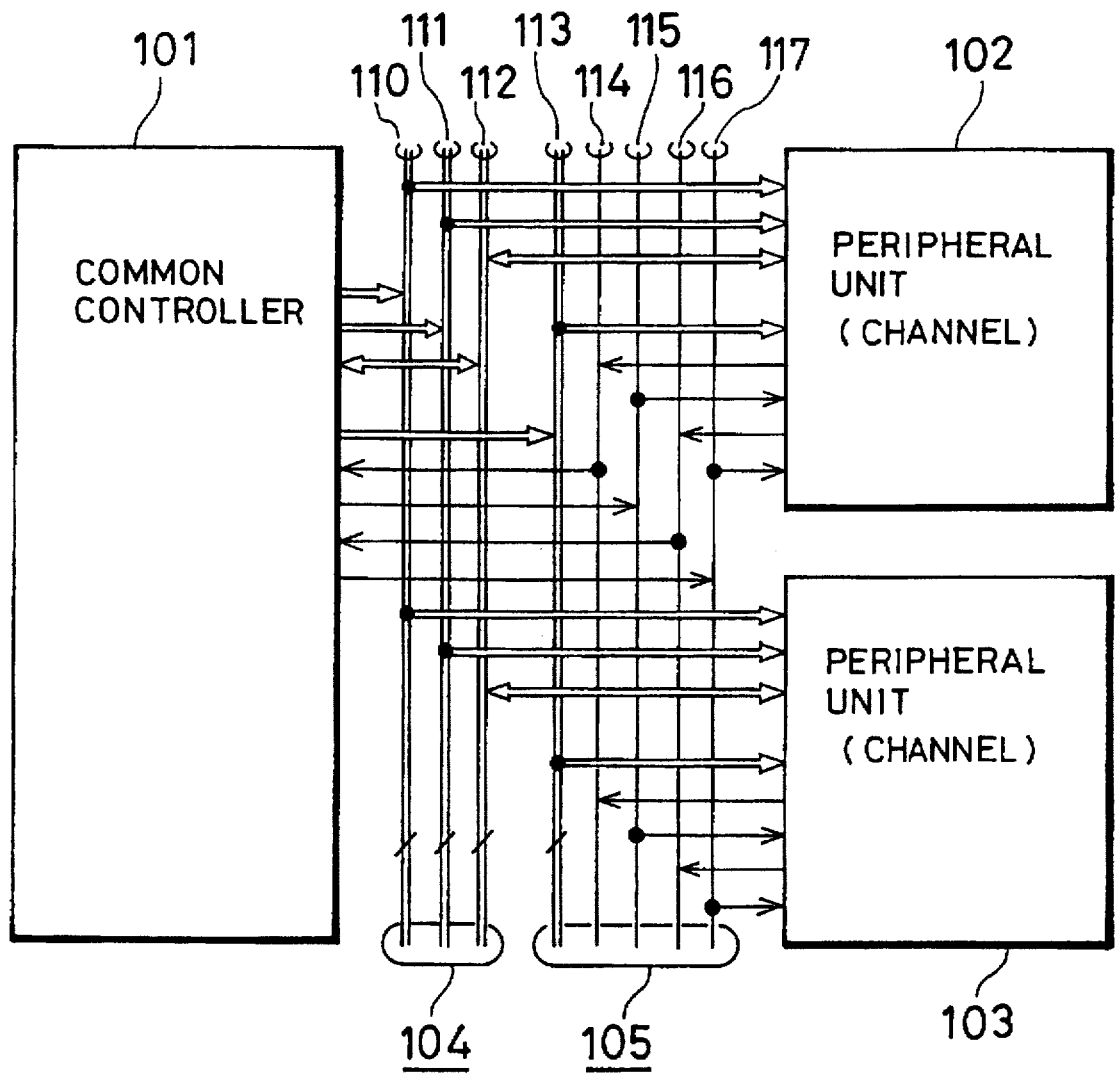
FIG. 1 is a block diagram illustrating an example of a signal transfer method of the prior art.
Figure 2:
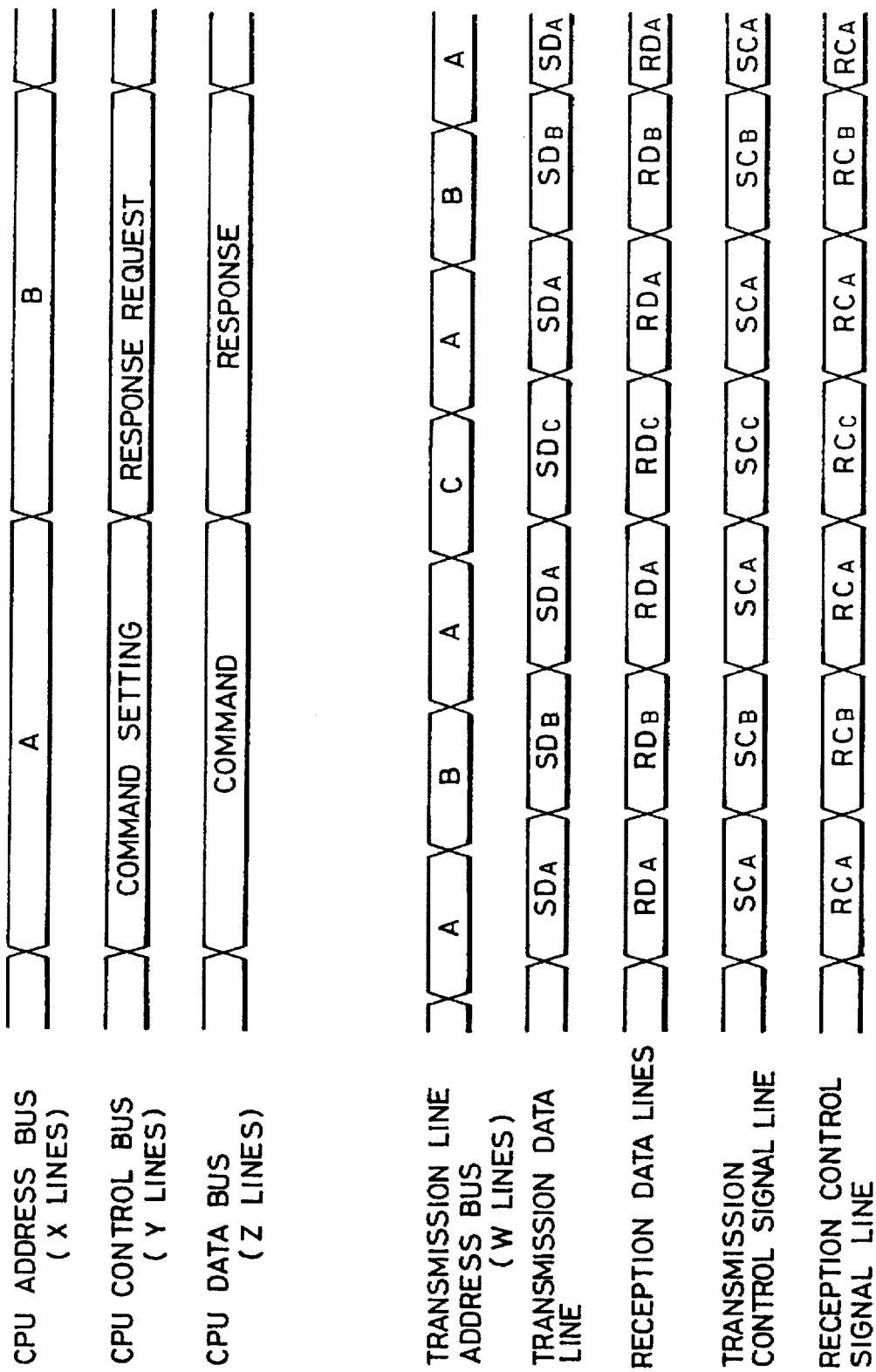
FIG. 2 is an explanatory diagram illustrating the transmission and reception timings in FIG. 1.

Preferred embodiments of the invention will now be described in detail referring to the accompanying drawings, in which the component parts common to FIG. 1 are designated by common reference numerals. The descriptions of the common component parts are omitted here to avoid unnecessary repetition.

Embodiment 1

Figure 6:
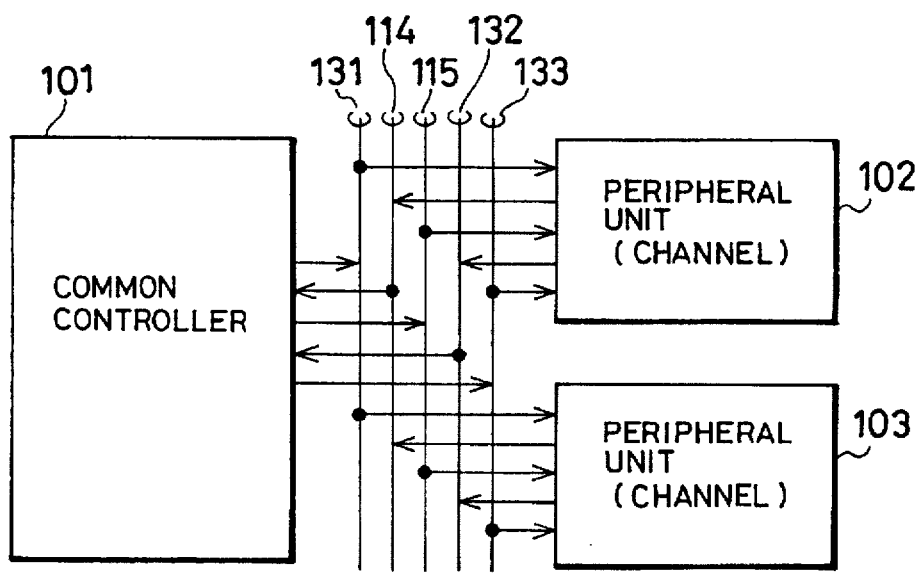
FIG. 6 is a block diagram illustrating an embodiment 1 of the present invention.

An embodiment 1 of the present invention will be explained hereunder. FIG. 6 is a block diagram illustrating a first embodiment according to the first aspect of the present invention. In this figure, the reference numeral 101 designates a common controller; 102, 103, channels as the peripheral units, 114, a transmission data line, 115, a reception data line. These are identical or correspond to those designated by the same reference numerals in FIG. 1 and therefore detailed description thereof is omitted herein. Moreover, the reference numeral 131 designates a serial address line which is used in common by serialized control address and transmission line address to be transmitted from the common controller 101, 132, a transmission control signal line used in common by response and transmission control signal transmitted from channels 102, 103, 133, a reception control signal line used in common by command and reception control signal transmitted from the common controller 101.

Figure 7:
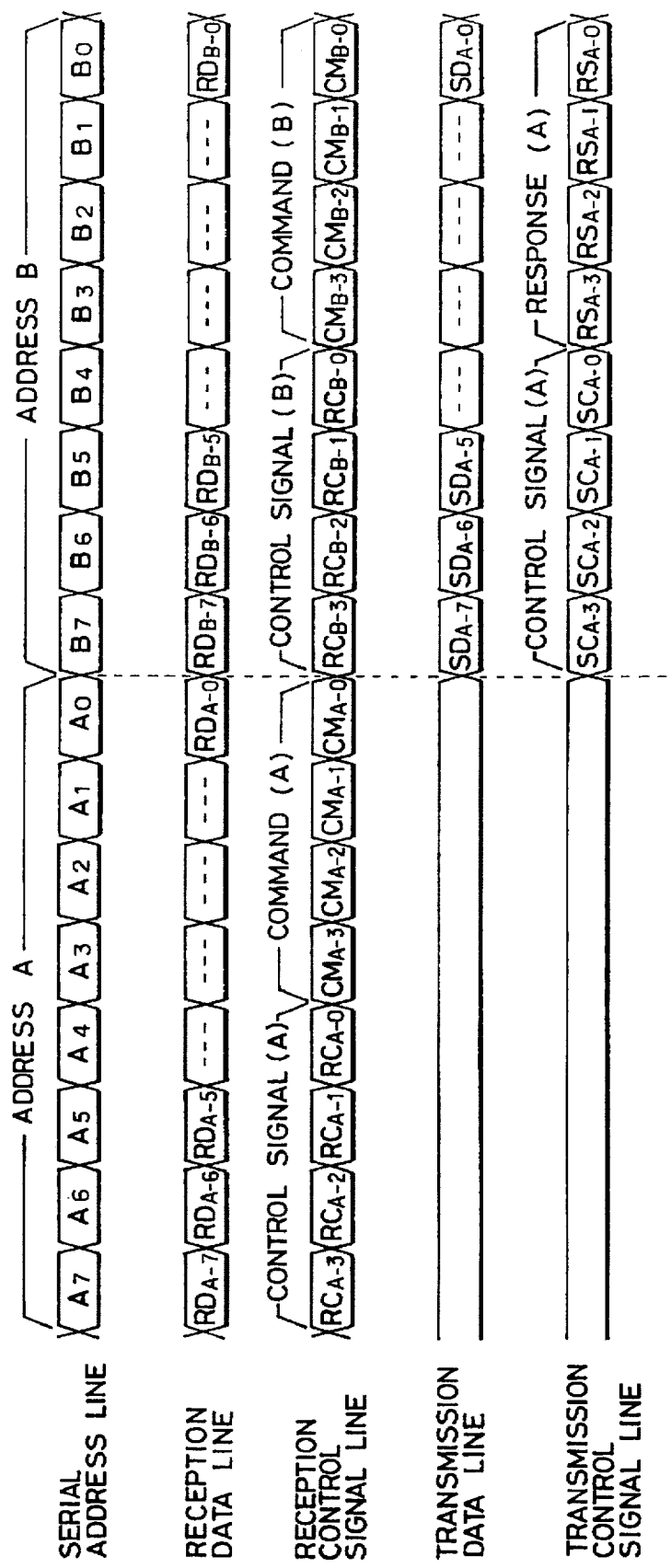
FIG. 7 is an explanatory diagram illustrating the transmission and reception timings in the embodiment 1.

Operations of the embodiment 1 will then be explained hereinbelow. FIG. 7 is an explanatory diagram illustrating transmission and reception timings of various data and signals transmitted over each signal line of a bus cable. In the case of this figure, the serial transmission in unit of eight (8) bits, for example, is carried out respectively for the serial address line 131, transmission data line 114, reception data line 115, transmission control signal line 132 and reception control signal line 133. Also, in this figure, "A" designates addresses and data in regard to the channel 102, while "B", those in regard to the channel 103.

Here, it is assumed that the common controller 101 transmits, for example, on the basis of multiplex mode, an address for designating the channel 102 to the serial address line 131, a data for the relevant channel 102 to the reception data line 115 and a control signal and a command to the reception control signal line 133. The channel 102 detects the address bound for itself when it has received the address "$A_0$" on the serial address line 131 and fetches therein the data from the reception data line 115 and control signal and command from the reception control signal line 133. Moreover, the channel 102 respectively outputs, in the next address band, a data for common controller 101 to the transmission data line 114 and a response and a control signal to the transmission control signal line 132 and the the common controller 101 receives these signals. The channel 102 discriminates a type of data transmitted and received by the next eight (8) bits with the command transmitted by the reception control signal line 133. Meanwhile the control signal is transmitted and received without relation to the command. It is also true in such a case that the common controller 101 transmits an address for designating the channel 103 to the serial address line 131.

Embodiment 2

Figure 8:
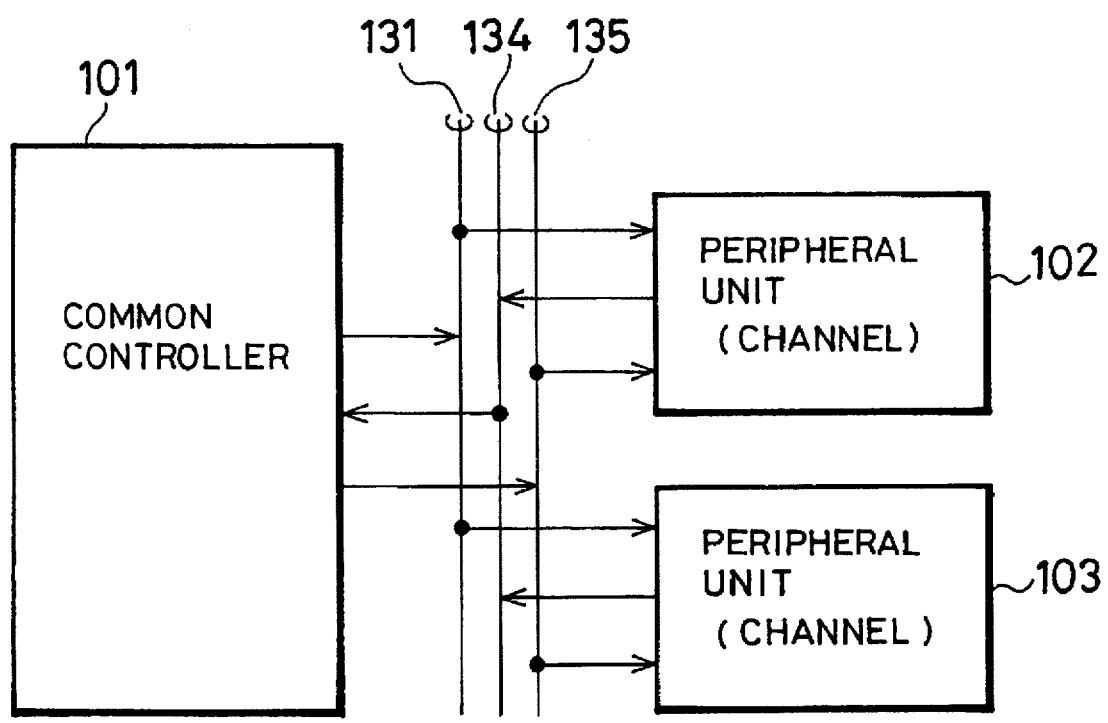
FIG. 8 is a block diagram illustrating an embodiment 2 of the present invention.

In above embodiment 1, the transmission data line 114, transmission control signal line 132, reception data line 115 and the reception control Signal line 133 are individually provided and moreover these lines may also be used in common. FIG. 8 is a block diagram illustrating an embodiment according to the second aspect of the present invention. The elements identical or corresponding to those in FIG. 6 are designated by the like reference numerals and detailed explanation thereof is omitted here. In this figure, the reference numeral 134 designates a transmission signal line used in common as the transmission data line 114 and transmission control signal line 132, 135, a reception signal line used in common as the reception data line 115 and the reception control signal line 133. In this case, the address transmitted over the serial address line 131 is provided with a newly added sign for discriminating the control signal band and data band.

Figure 9:
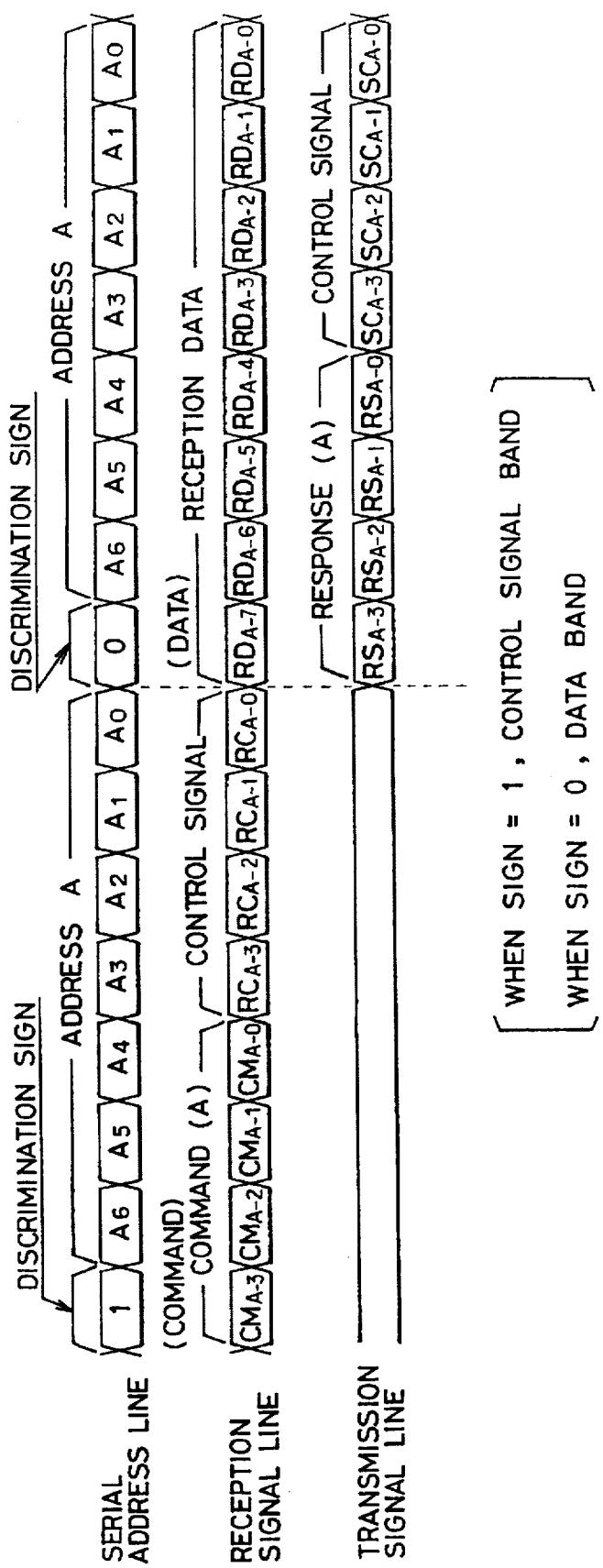
FIG. 9 is an explanatory diagram illustrating the transmission and reception timings in the embodiment 2.

Operations of this embodiment 2 will then be explained below. Here, FIG. 9 is an explanatory diagram illustrating the transmission and reception timings of various kinds of data and signals to be transmitted with respective signal lines of a bus cable. In this case, the alphabet "A" designates addresses and data in regard to the channel 102. The channel 102 detects an address bound for itself when it has received "A$_0$" in the address output on the serial address line 131 from the common controller 101. The channel 102 simultaneously decides that the signals existing on the reception signal line 135 are the control signal and command, since the discrimination sign is "1" and also conducts the operations similar to that in the embodiment 1. In addition, when the discrimination sign is "0", the channel 102 decides that the signal existing on the reception signal line 135 is the data transmitted from the common controller 101.

Embodiment 3

Figure 3:
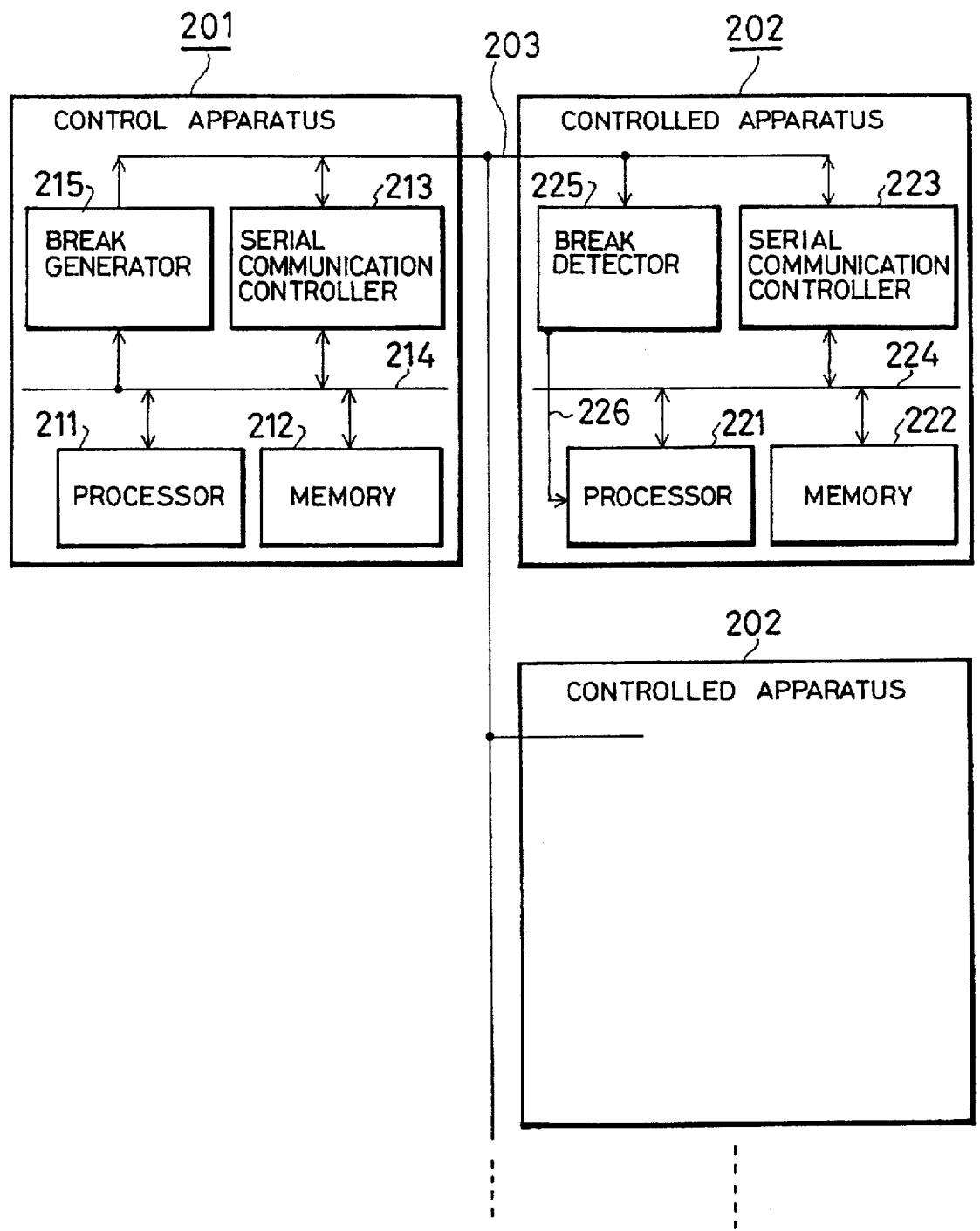
FIG. 3 is a block diagram illustrating another example of a signal transfer method of the prior art.
Figure 10:
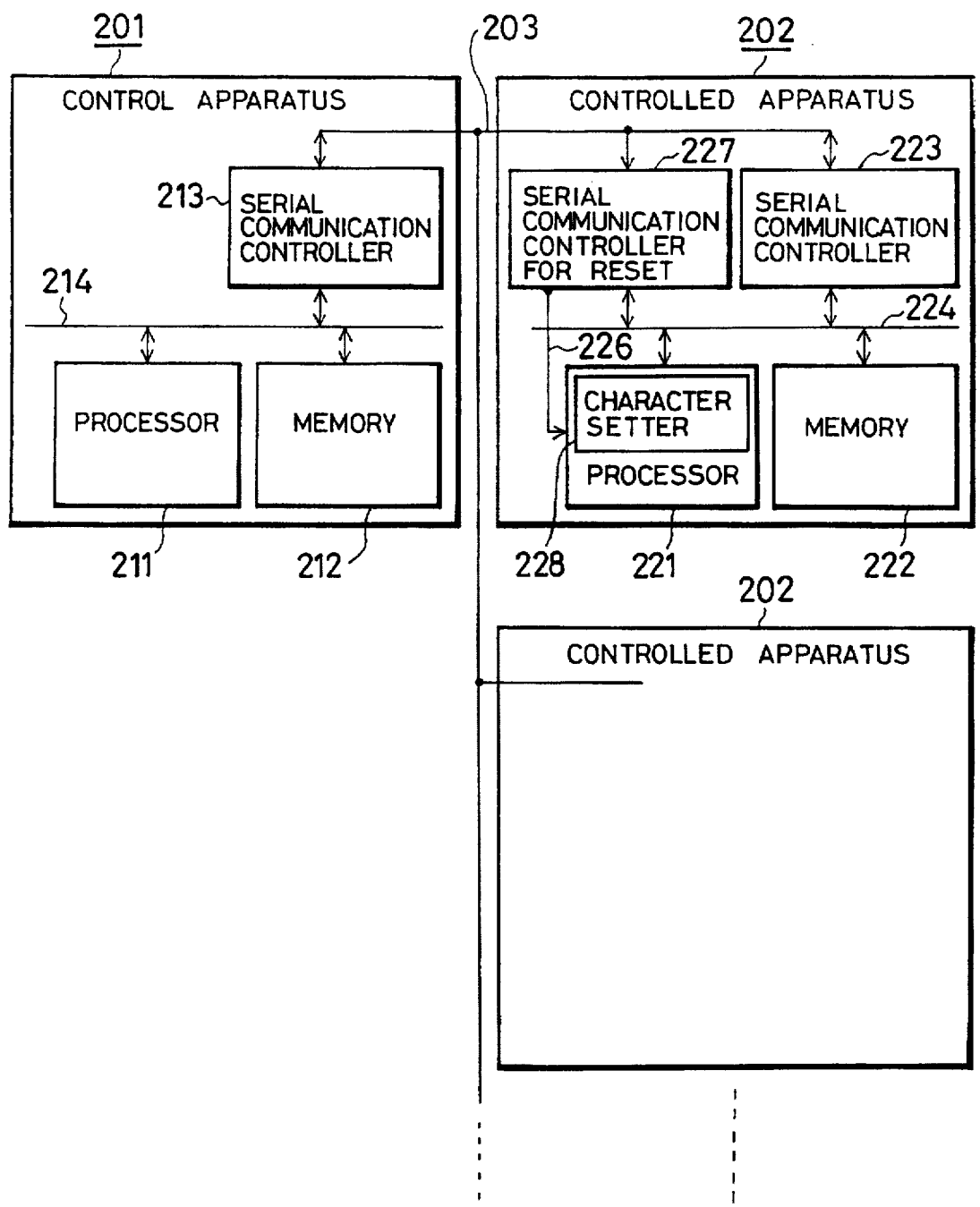
FIG. 10 is a block diagram illustrating an embodiment 3 of the present invention.

An embodiment 3 of the present invention will be explained. FIG. 10 is a block diagram illustrating an embodiment according to the third aspect of the present invention. In this figure, the reference numeral 201 designates a control apparatus, 202 a controlled apparatus, 203, a serial control line, 211, 221, processors, 212, 222, memories, 213, 223, serial communication controllers, 214, 224, internal buses, 226, a reset signal line. The elements identical or corresponding to those in FIG. 3 are designated by the like reference numerals and detailed explanation thereof is omitted here.

Moreover, in the controlled apparatus 202, the reference numeral 227 designates a serial communication controller for reset which is connected in parallel with a serial communication controller 223 to transmit a reset signal for resetting the processor 221 to the reset signal line 226, upon detection of a reset character assigned individually to each controlled apparatus 202 in the signal transmitted to the serial control line 203, 228, a character setter provided within the processor 221 in order to set a reset character assigned to the relevant controlled apparatus 202 to the serial communication controller 227 for reset.

Operations of this embodiment will then be explained. Here, in each controlled apparatus 202, a reset character assigned individually to each controlled apparatus is preset to the serial communication controller 227 for reset by the character setter 228 provided in the respective processor 221.

Now, the control apparatus 201 requests to reset a particular apparatus among a plurality of controlled apparatuses 202, the control apparatus 201 sends an instruction to transmit a reset character assigned to the controlled apparatus 202 to be reset to the serial communication controller 213 from the processor 211. The serial communication controller 213 transmits, depending on the instruction issued from the processor 211, the reset character assigned to the relevant controlled apparatus 202 to the serial control line 203.

Each controlled apparatus 202 receives the reset character transmitted to the serial control line 203 from the control apparatus 201 with the serial communication controller 223 and serial communication controller 227 for reset connected in parallel. The serial communication controller 227 for reset of each controlled apparatus 202 sends a reset signal to the processor 221 via the reset signal line 226, upon detection that the received character matches the reset character which is preset by the processor 211 and assigned to the relevant controlled apparatus 202. Therefore, the processor 221 is reset by this reset signal only in the relevant controlled apparatus 202.

Embodiment 4

Figure 11:
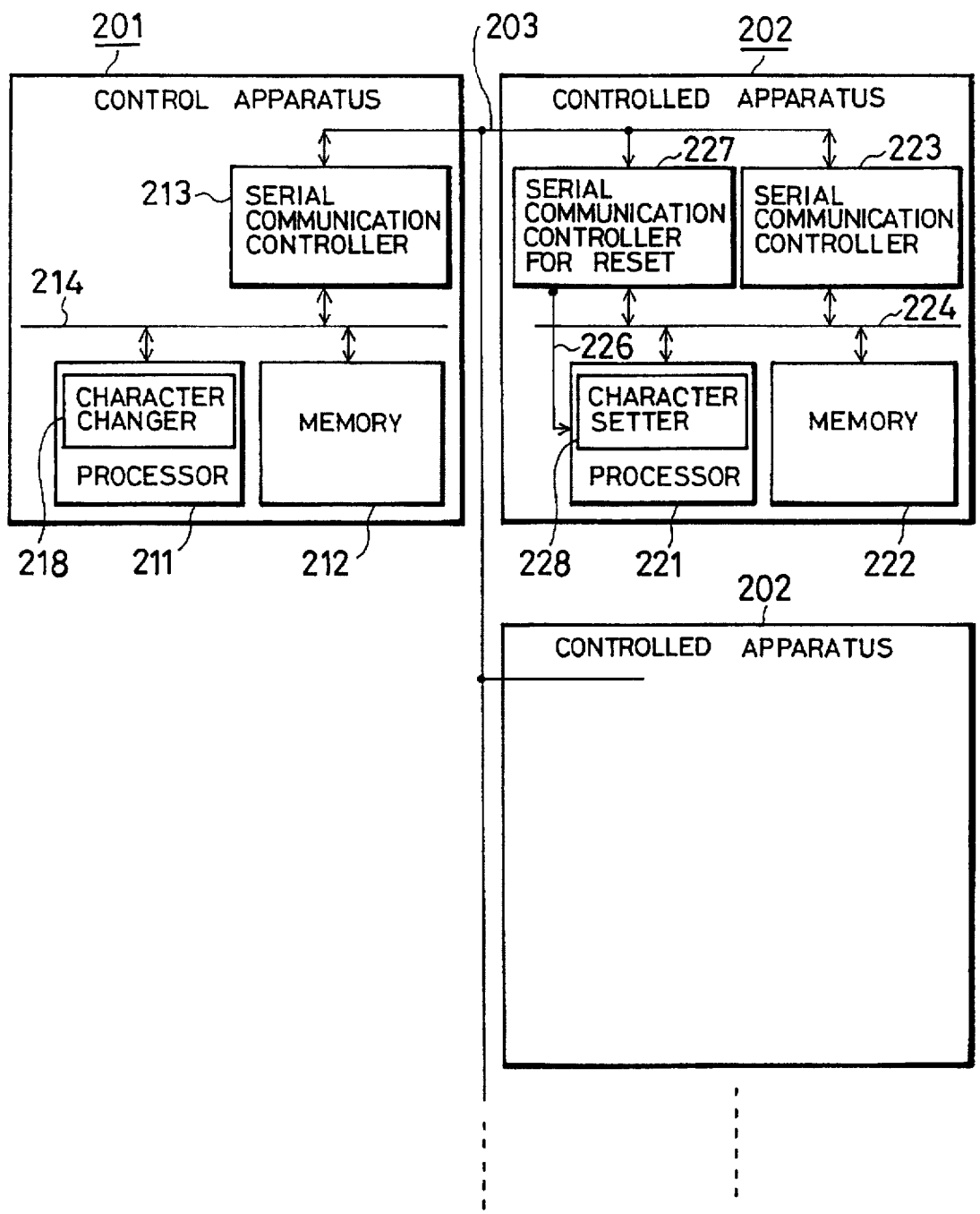
FIG. 11 is a block diagram illustrating an embodiment 4 of the present invention.

In above embodiment 3, a reset character of each controlled apparatus is stationarily assigned, but such setting may be changed with a control from the control apparatus. FIG. 11 is a block diagram illustrating an embodiment according to the fourth aspect of the present invention. The element identical or corresponding to those in FIG. 10 are designated by the like reference numerals and detail explanation of these elements is omitted here. In FIG. 11, the reference numeral 218 designates a character changer provided within the processor 211 of the control apparatus 201 in order to instruct the serial communication controller 213 to generate an instruction for changing the reset character to each controlled apparatus 202.

Operations of this embodiment will then be explained below. The same reset character is usually set to the serial communication controller 227 for rest and the controlled apparatus 202 forming a group which are reset-controlled at a time are caused, for example, to execute different controls. In this case, such controlled apparatus are requested to be reset individually, the control apparatus 201 instructs transmission of a command to change the reset character to the predetermined controlled apparatus 202 to the serial communication controller 217 from the character changer 218 within the processor 211. The serial communication controller 213 which has received this command generates an instruction for changing the preset character to the designated reset character to the designated controlled apparatus 202 and then transmits this instruction to the serial control line 203.

The relevant controlled apparatus 202 receives such instruction through the serial communication controller 223 and then sends the instruction to the processor 221 via the internal bus 224. In the processor 221, the built-in character setter 228 changes, by issuing an instruction, the reset character preset to the serial communication controller 227 for reset to the designated reset character. The subsequent operations are identical to that in the embodiment 3 and detailed explanation thereof is omitted here.

Embodiment 5

Figure 4:
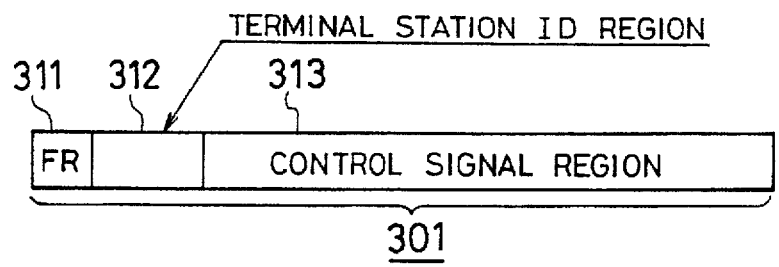
FIG. 4 is a format of a control frame for transferring the control signal used in another example of a signal transfer method of the prior art.
Figure 12:
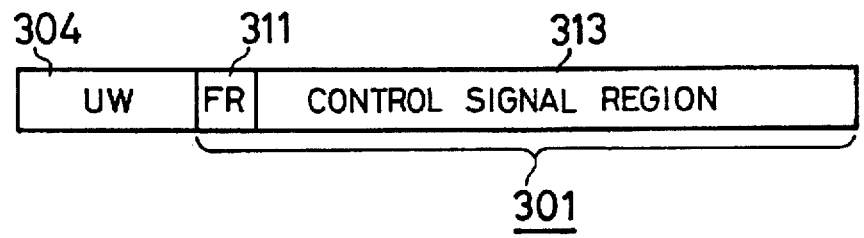
FIG. 12 is a format of a control frame for transferring the control signal used in an embodiment 4 of the present invention.

An embodiment 5 of the present invention will be explained with reference to the accompanying drawings. FIG. 12 is a format of a control frame for transferring the control signal used in an embodiment according to the fifth aspect of the present invention. The reference numeral 301 designates a control frame, 311, a frame synchronous pattern; 313, a control signal. The element identical or corresponding to those of FIG. 4 are designated by the like reference numerals and detailed explanation thereof is omitted here. The reference numeral 304 designates a unique word which is individually set to each terminal station and added immediately before the control frame 301.

Figure 5:
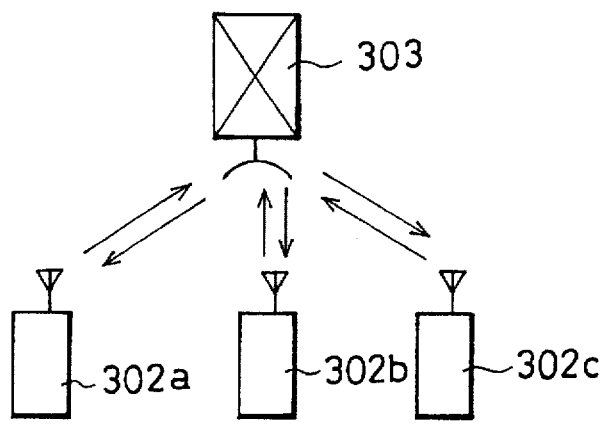
FIG. 5 is a structural diagram illustrating an example of a communication system to which an example of FIG. 4 is applied.
Figure 13:
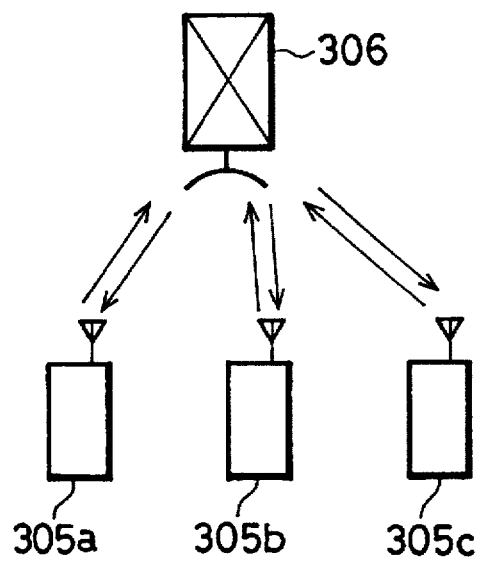
FIG. 13 is a structural diagram illustrating an example of a communication system to which the embodiment 5 is applied.

FIG. 13 a structural diagram illustrating an example of a communication system to which the embodiment 5 is applied. In this figure, reference numerals 305a, 305b, 305c designate a plurality of terminal stations, 306, a control station for integrally controlling the terminal stations 305a, 305b, 305c. These control station and terminal stations are different from the conventional terminal stations 302a, 302b, 302c and the control station 303 shown in FIG. 5 in the point that the control signal is transmitted or received using the control frame 301 adding the unique word 304 as shown in FIG. 12.

Operations of this embodiment will then be explained below. For the control of a terminal station 305a, the control station 306 transmits a control signal using a control frame 301 adding a unique word 304 corresponding to the terminal station 305a to the region immediately before the frame synchronous pattern. The terminal station 305a detects the unique word assigned thereto and then receives the control frame 301, followed by necessary processings based on the control signal itself of the control signal region 313 in the relevant control frame 301. On the other hand, the other terminal stations 305b, 305c are respectively provided with the means for detecting the unique words corresponding thereto and does not receive the control frame 301 transmitted to the terminal station 305a.

A control frame 301 transmitted to the control station 306 from the terminal station 305a is also transmitted in the format adding a unique word 304 corresponding to the terminal station 305a as shown in FIG. 12. The control station 306 discriminates, from the received unique word 304, a terminal station among a plurality of terminal stations 305a, 305b, 305c from which the control frame 301 has been transmitted. In above description, only the terminal station 305a is considered, but this description is also true to the other terminal stations 305b and 305c.

As stated above, a control frame 301 adding a unique word individually set for the terminal stations 305a, 305b, 305c is transmitted and received and the control station 306 discriminates and controls the terminal stations 305a, 305b, 305c depending on such unique word. Therefore, the terminal station ID region for discriminating the terminal stations 305a, 305b, 305c is no longer necessary within the control frame 301. Moreover, since the terminal stations 305a, 305b, 305c are discriminated by the unique word 304, if a control signal is generated like a burst due to its property, such control signal can be transmitted and received accurately.

Embodiment 6

Figure 14:
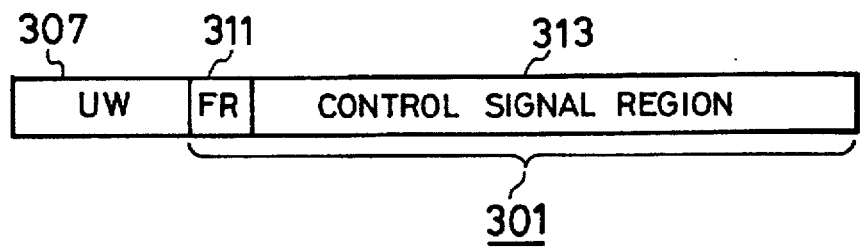
FIG. 14 is a format of a control frame for transferring the control signal used in an embodiment 6 of the present invention.
Figure 15:
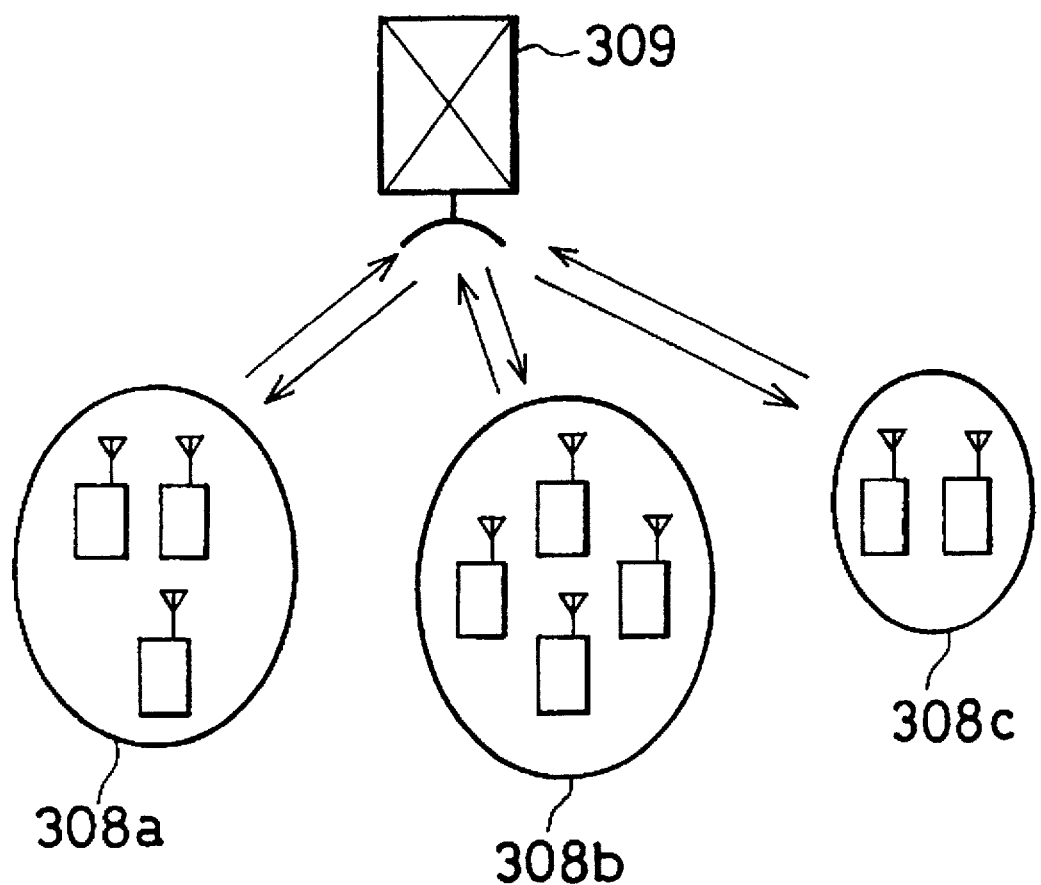
FIG. 15 is a structural diagram illustrating an example of a communication system to which the embodiment 6 is applied.

In above embodiment 5, terminal stations are individually controlled, but it is also possible to control the terminal stations in unit of a group by setting a unique word for each group of terminal station. FIG. 14 is a format illustrating an embodiment according to the sixth aspect of the present invention. The elements identical or corresponding to those of FIG. 12 are designated by the like reference numerals and detailed explanation thereof is omitted here. In this figure, the reference numeral 307 designates a unique word which is individually set for each terminal station group and added in the region immediately before the control frame 301. Moreover, FIG. 15 is a structural diagram illustrating an example of a communication system to which the signal transfer method by the embodiment 6 is applied. In FIG. 15, 308a, 308b, 308c are groups of terminal stations established depending on the predetermined purposes; 309, a control station for integrally controlling the terminal stations of terminal station groups 308a, 308b, 308c.

Operations of this embodiment will then be explained below. In the case of integrally controlling the terminal stations belonging to a terminal station group 308a, the control station 309 transmits the control signal with the control frame 301 adding a unique word 307 corresponding to the terminal station group 308a in the region immediately before the frame synchronous pattern 311. Each terminal station belonging to the terminal station group 308a receives, like the embodiment 5, the control frame 301, upon reception of the relevant unique word 307 and respectively executes the necessary processings based on the control signal itself of the control signal region 313. Each terminal station of the other terminal station groups 308b, 308c cannot detect the relevant unique word 307 and therefore cannot receive the control frame 301.

As stated above, according to the first aspect of the present invention, there is provided an effect of achieving a signal transfer method which has remarkably reduced the number of signal lines of a bus cable and realized reduction in size of the apparatus, because a control address and a transmission line address are serialized to use in common a serial address line, a transmission control signal line is used in common with response and a transmission control signal from peripheral units, while a reception control signal line with command and a reception control signal from a common controller.

Further, according to the second aspect of the present invention, there is provided an effect of further reducing the number of signal lines of a bus cable, because a transmission control signal line and a transmission data line can be used in common, while a reception control signal line and a reception data line also can be used in common, by adding a sign for discriminating the control signal band or data band to an address transmitted by the serial address line.

Further, according to the third aspect of the present invention, there is provided an effect of achieving a signal transfer method which enables reset of the predetermined apparatus among a plurality of controlled apparatus having the same structure from a control apparatus, because a controlled apparatus executes the reset control thereof by detecting a reset character assigned thereto on the serial control line.

Further, according to the fourth aspect of the present invention, there is provided an effect of realizing more flexible reset processing, because a reset character of each controlled apparatus can be formed so as to be changed depending on an instruction from the control apparatus.

Further, according to the fifth aspect of the present invention, there is provided an effect of achieving a signal transfer method which is not required to provide a terminal station ID region within the control frame and can increase as much the amount of information of the control signal itself for the maximum use of the control frame for the control signal itself, because a unique word which is different for each terminal station is added immediately before the control frame and the terminal stations are individually discriminated with the unique words for the control thereof, and an effect of realizing transmission and reception of the control signal, although it may be the control signal like a burst signal, because a unique word is used for discrimination.

Further, according to the sixth aspect of the present invention, there is provided an effect of controlling the terminal stations in unit of the group having the same purpose, because a unique word is set corresponding to each terminal station group established for the predetermined purposes.

What is claimed is:

1. A signal transfer method for transmitting and receiving between a control station and a plurality of terminal stations over a communication medium a control signal for controlling said plurality of terminal stations by said control station, said control signal being contained within a control frame, the method comprising the steps of:

assigning a unique word to each of said plurality of terminal stations;

adding a unique word corresponding to a particular terminal station to a control frame transmitted from said particular terminal station to said control station, and to a control frame intended to be received by said particular terminal station from said control station, said unique word being added immediately before said control frame;

transmitting said control frame over said communication medium;

wherein destination terminal stations discriminating control frames based on reception of said unique word, such that said particular terminal station detects said unique word and subsequently receives the control frame associated therewith, and terminal stations other than said particular terminal station do not receive said control frame; and said control station identifies terminal stations originating a control frame message by detecting said unique word.

2. The signal transfer method of claim 1 wherein:

said unique word is an individually assigned reset character for resetting each of the controlled apparatuses, each reset character being unique to a specific one of said terminal stations and different from every other assigned reset character;

each terminal station executing reset control thereof by detecting said reset character assigned thereto on said communication medium; and changing the setting of reset characters individually assigned to each of said control stations by transmitting an instruction for change of reset character to each terminal station from said control station.

3. A signal transfer method for transmitting and receiving between a control station and a plurality of terminal stations over a communication medium a control signal for controlling said plurality of terminal stations by said control station, said control signal being contained within a control frame, the method comprising the steps of:

dividing said plurality of terminal stations into a plurality of terminal station groups, wherein a terminal station group is capable of designating at least two terminal stations;

assigning a unique word to each of said plurality of terminal station groups;

adding a unique word corresponding to a particular terminal station group to a control frame transmitted from a terminal station in said particular terminal station group to said control station, and to a control frame intended to be received by said particular terminal station group from said control station, said unique word being added immediately before said control frame;

transmitting said control frame over said communication medium;

wherein destination terminal station groups discriminating control frames based on reception of said unique word, such that said particular terminal station group detects said unique word and subsequently receives the control frame associated therewith, and terminal station groups other than said particular terminal station group do not receive said control frame; and said control station identifies terminal station groups originating a control frame message by detecting said unique word.

* * * * *